(12) United States Patent
Umeda

(10) Patent No.: US 6,531,802 B2
(45) Date of Patent: *Mar. 11, 2003

(54) AC GENERATOR FOR VEHICLE

(75) Inventor: Atsushi Umeda, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/817,213

(22) Filed: Mar. 27, 2001

(65) Prior Publication Data

US 2002/0047484 A1 Apr. 25, 2002

(30) Foreign Application Priority Data

Mar. 31, 2000 (JP) ........................................ 2000-098140

(51) Int. Cl.[7] .............................................. H02K 19/22
(52) U.S. Cl. ..................................................... 310/263
(58) Field of Search .......................... 310/91, 261, 263, 310/254, 201; 29/596–598

(56) References Cited

U.S. PATENT DOCUMENTS

| | | | | |
|---|---|---|---|---|
| 4,307,314 A | * | 12/1981 | Yamada et al. | 310/263 |
| 5,424,591 A | * | 6/1995 | Kuriyama | 310/12 |
| 6,097,130 A | | 8/2000 | Umeda et al. | 310/263 |
| 6,104,118 A | * | 8/2000 | Kanazawa et al. | 310/263 |
| 6,127,763 A | * | 10/2000 | Nakamura et al. | 310/263 |

* cited by examiner

Primary Examiner—Tran Nguyen
(74) Attorney, Agent, or Firm—Oliff & Berridge, PLC

(57) ABSTRACT

An axial length of an iron core of a stator is set larger than an axial length of a cylindrical part on which a field coils are wound. An axial thickness of a yoke part is set larger than a radial thickness of a claw-like magnetic pole part. The cylindrical part is separate from the yoke part and fixed to the yoke part with the cylindrical part in contact with the yoke part. Thus, the contact surface of the cylindrical part and that of the yoke part serve as a thermal resistance, respectively, thereby preventing heat from being transmitted from the yoke part to the cylindrical part.

7 Claims, 6 Drawing Sheets

AC GENERATOR FOR VEHICLE

CROSS-REFERENCE TO RELATED APPLICATION

The present invention is related to Japanese patent application No. 2000-98140, filed Mar. 31, 2000; the contents of which are incorporated herein by reference.

FIELD OF THE INVENTION

The present invention relates to an AC generator for a vehicle which is driven by an internal combustion engine, and more particularly to an AC generator which is mounted on a vehicle such as a passenger car, a truck, and the like.

BACKGROUND OF THE INVENTION

In recent years, vehicle bodes have been formed in slanted nose shapes to reduce air resistance acting on the vehicle body. Further, there is a demand for securing a sufficient residential space in the passenger compartment of the vehicle. This has reduced the engine room size, thereby limiting the space in which the AC generator for the vehicle can be installed. Also, in recent years, the engine speed has been reduced to save a fuel cost. Consequently, the rotational speed of the AC generator is reduced. On the other hand, demand for electric load has increased for safety control devices and the like. Thus, power-generating is increasingly demanded. Therefore, there is demand for a supply of compact, inexpensive, and high-power rotary electrical machine.

To comply with this demand, there has been proposed various devices, such as shown in FIG. 7, of Japanese Patent Application Laid-Open No.11-164499. Such a device allows the AC generator to output high power by setting the axial length of the iron core of the stator longer than the field coil of the rotor. Moreover, magnetic flux is injected directly into the iron core of the stator from the yoke to reduce the radial thickness of the claw-like magnetic pole and increase the winding area of the winding of the rotor by that much.

However, this construction has the following problems. Specifically, in a Lundel-type pole core, affected by an alternating magnetic flux applied by the stator, eddy currents are generated on the surface of the claw-like magnetic pole thereof. Because the claw-like magnetic pole is opposed to the stator which is heated to a high temperature by generated electric current, the claw-like magnetic pole is heated to an extremely high temperature by eddy current-caused self-heat development and heat transferred thereto from the stator. The claw-like magnetic pole is heated to an extremely high temperature at the central part of its peripheral surface to which the magnetic flux is collectively applied. A heat flow W generated there by the rise of temperature reaches the cylindrical part of the pole core as shown in FIG. 9, thus raising the temperature of the cylindrical part.

Referring to FIG. 8, in the construction disclosed in the Japanese Patent Application Laid-Open No.11-164499, the volume of the claw-like magnetic pole is small, and the area of the side surface S is also small. Thus, the claw-like magnetic pole has an eddy current-caused self-heat development owing to its reduced heat capacity. Further, the claw-like magnetic pole has a suppressed rotation-caused heat release. Therefore, the claw-like magnetic pole is heated to a very high temperature.

As a result, the heat flow increases due to the temperature rise of the claw-like magnetic pole and is transferred to the boss located at the central part of the iron core through the yoke part. Consequently, the central part of the rotor is heated to an extremely high temperature.

When the boss is heated to a very high temperature, the winding of the rotor, the resinous bobbin on which the winding is wound, and the iron core of the boss thermally expand. Because the coefficient of thermal expansion of the resin and the metal are different from each other, thermal stress is generated on the interface therebetween. In this case, as the temperature of the boss becomes higher, the thermal stress becomes increasingly large. Further, because the generator for a vehicle generates heat every time the vehicle is driven, the thermal stress is repeatedly generated on the boss, the bobbin, and the like and thereby causes fatigue.

Referring to FIG. 7, the gap A between the yoke part of the pole core and the bobbin on which the field coil is wound is filled with a resin-impregnated material. The difference between the thermal expansion of the iron core of the boss and the bobbin surrounding the iron core of the boss causes the resin-impregnated material filled in the gap A to crack or become damaged. Consequently, there is a reduction in the fixing strength at which the bobbin and the pole core are fixed to each other. Thus, when the rotor rotates, the bobbin rotates relative to the pole core, thus causing the coil to be cut and power generation to be stopped.

Therefore, it is necessary to enlarge the cooling fan to increase cooling wind. It is also necessary to reduce output current to restrain the claw-like magnetic pole from receiving heat from the stator, which reduces the intended effect of miniaturizing the generator and allowing it to have a high power output.

SUMMARY OF THE INVENTION

It is therefore an object of the present invention to provide a compact AC generator for a vehicle having a high power output and high reliability by minimizing a heat flow which is transferred to the central part of the pole core. Therefore, in a first aspect, the present invention provides an AC generator for a vehicle comprising a field rotor and a stator. The field rotor has a field coil and a Lundel-type iron core. The Lundel-type iron core has a cylindrical part on which the field coil is wound, a yoke part extending radially outward from the cylindrical part, and a claw-like magnetic pole part connected to the yoke part and surrounding the field coil. In this construction, the field coil is wound on an insulating bobbin and contacts the cylindrical part. An axial end surface of the bobbin is fixed to the yoke part through an adhesive agent. The stator has an iron core confronting the rotor and a multiple-layer winding mounted on the iron core. In this construction, an axial length (L1) of the iron core of the stator is set larger than an axial length (L2) of the cylindrical part. An axial thickness (X2) of the yoke part is set larger than a radial thickness (X1) of the claw-like magnetic pole part. The cylindrical part is separate from the yoke part and fixed to the yoke part with the cylindrical part in contact with the yoke part.

As described above, the axial length (L1) of the iron core of the stator is set larger than the axial length (L2) of the cylindrical part, and the axial thickness (X2) of the yoke part is set larger than the radial thickness (X1) of the claw-like magnetic pole part. In this construction, the temperature of the claw-like magnetic part greatly rises. As also described above, the cylindrical part is separate from the yoke part and fixed to the yoke part with the cylindrical part in contact with the yoke part. Thus, the contact surface of the cylindrical part and the yoke part serve as a thermal resistance, respectively. Thus, heat transmission from the yoke part to the cylindrical part is prevented. Consequently, temperature rise of the cylindrical part is reduced. Thereby, thermal stress is reduced, and thermal fatigue of adhesive material filled between the bobbin and the yoke part is reduced. Thus fixing the bobbin to the yoke part is accomplished without deteriorating the compactness of an AC generator and maintaining a high power output.

In another aspect of the invention, a gap is formed between a contact surface of the cylindrical part and that of the yoke part. Because the gap is formed between the contact surface of the cylindrical part and that of the yoke part, heat is prohibited from being transferred from the yoke part to the cylindrical part, thereby improving reliability of the generator.

In another aspect of the invention, an oxide film is formed on the contact surface of the cylindrical part and the yoke part. Therefore, prohibiting heat transfer from the yoke part to the cylindrical part.

In another aspect of the invention, the ratio of the axial length (L1) of the iron core of the stator to the axial length (L2) of the cylindrical part is set in the range of 1.25 to 1.75. Likewise, the ratio of the radial thickness (X1) of the claw-like magnetic pole part to the axial thickness (X2) of the yoke part is set in the range of 0.5–0.9. The output current is high because the ratios are set to the above-described range. Thus, the cylindrical part receives much heat from the claw-like magnetic pole part. Therefore, the generator effectively suppresses heat transfer.

In another aspect of the invention, in a plurality of respective spaced slots, the multiple-layer winding of the stator has pairs of conductive segments insulated from each other and arranged circumferentially without overlapping. One part of each pair forms an inner layer with respect to a depth direction of each of the slots. Likewise, the other pair forms an outer layer with respect to a depth direction. Outside the slots, the conductive segments extend to an end-surface side of the iron core of the stator to form coil ends by connecting the inner-layer and outer-layer in the slots in series to each other such that a group of the coil ends consisting of a plurality of repetition of the connection patterns is formed on the end-surface side of the iron core of the stator.

In this construction, the coil ends of the stator are prevented from overlapping each other. This allows the stator coil to be disposed in high density and with favorable ventilation. Thus, temperature rises of the stator coil are suppressed. Consequently, the amount of heat received by the claw-like magnetic pole from the stator is reduced, as well as the temperature rise of the cylindrical part. Accordingly, reliability of the AC generator is improved.

In another aspect of the invention, the rotor has 16 poles or more. Here, the generated electric frequency is high. Thus, eddy currents generate much heat. In addition, because the output current increases, the cylindrical part receives much heat from the claw-like magnetic pole part. Thus, the reliability of the generator can be improved owing to suppression of the heat transmission.

In another aspect of the invention, the rotor has a metal cooling fan mounted on both axial end surfaces thereof, thereby increasing heat transfer between the Lundel-type iron core and the cooling fan. Here, the configuration of the cooling fans are different from each other to vary exhaust capabilities thereof from each other and generate an axial flow inside the rotor. This allows the cooling fan to radiate heat favorably and an axial flow to be generated inside the rotor. Thereby, the temperature of the claw-like magnetic pole is reduced, and the AC generator is reliable.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE INVENTION

Figure 1:
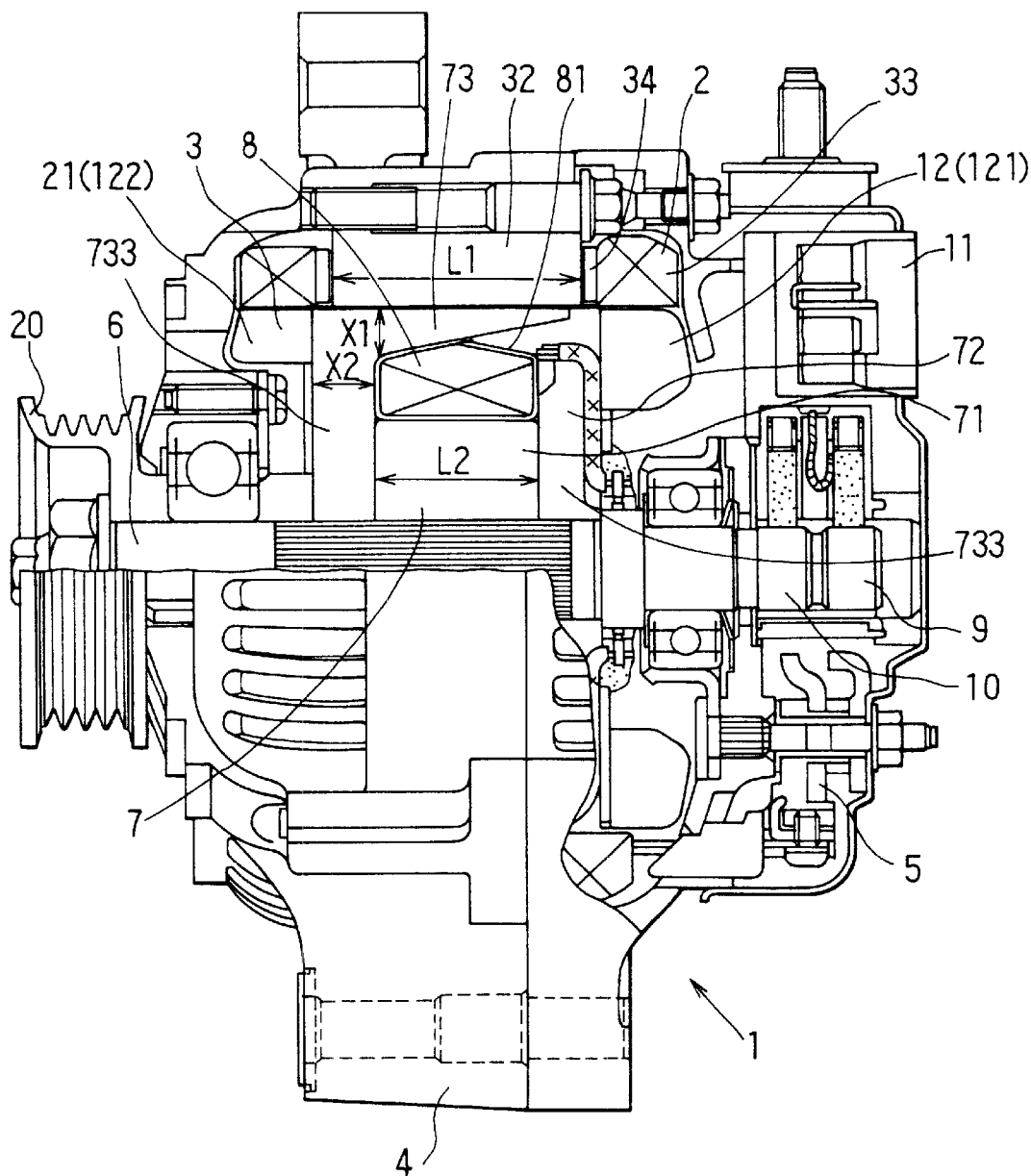
FIG. 1 is a sectional view showing an AC generator for a vehicle according to the present invention.
Figure 2:
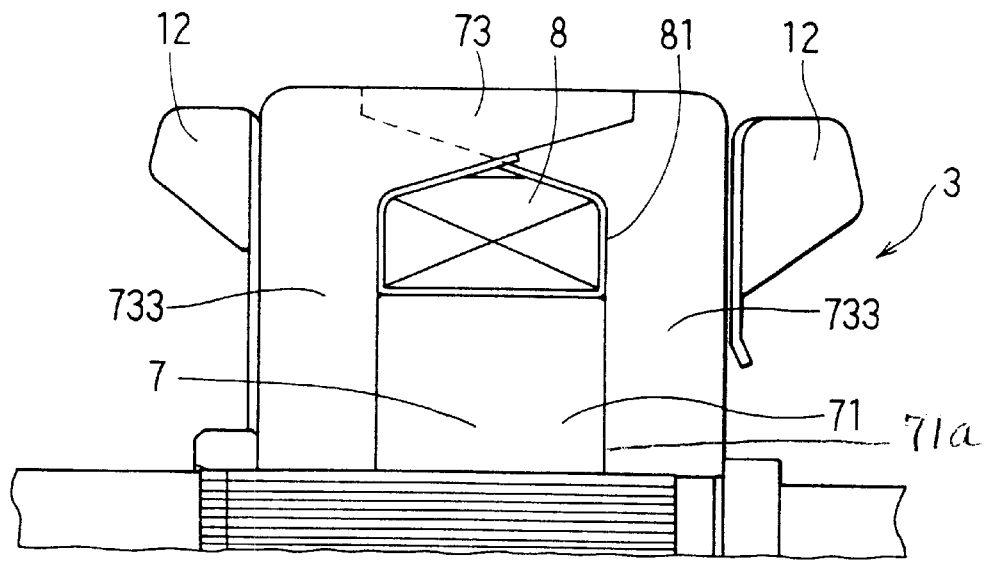
FIG. 2 is a sectional view showing a pole core of a rotor of the AC generator for a vehicle according to the present invention.
Figure 3:
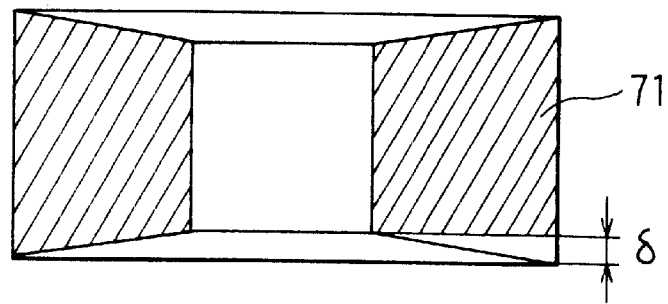
FIG. 3 shows a section of a cylindrical part of the pole core of the rotor of the AC generator for a vehicle according to the present invention.
Figure 4:
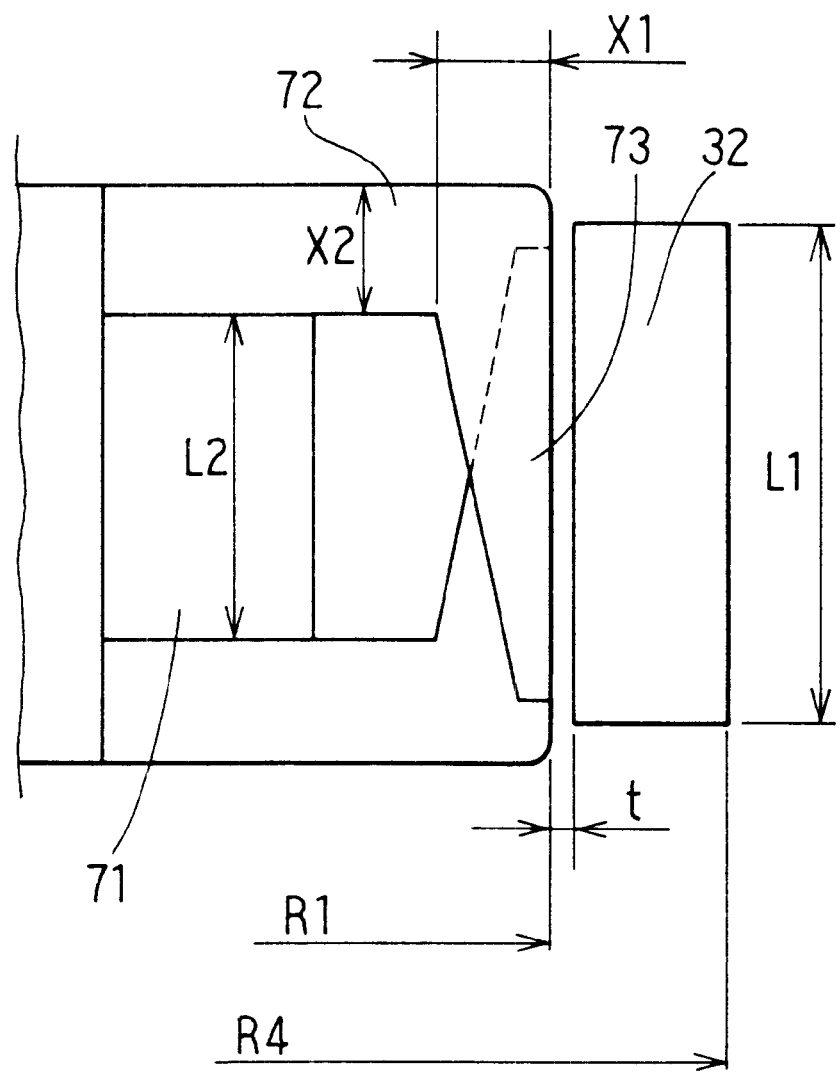
FIG. 4 is a partial sectional view showing the pole core, in its axial direction, of the rotor of the AC generator for a vehicle of this embodiment.
Figure 5:
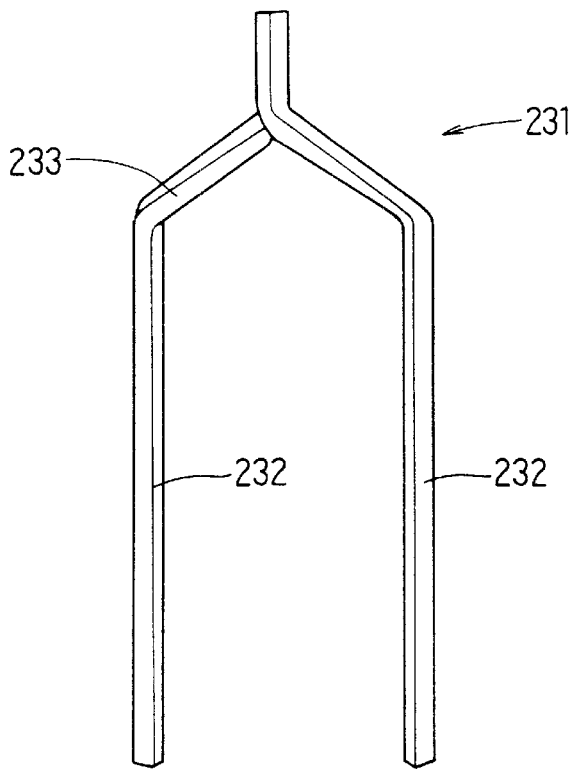
FIG. 5 shows a detailed configuration of an approximately U-shaped electric conductor constituting a stator coil.
Figure 6:
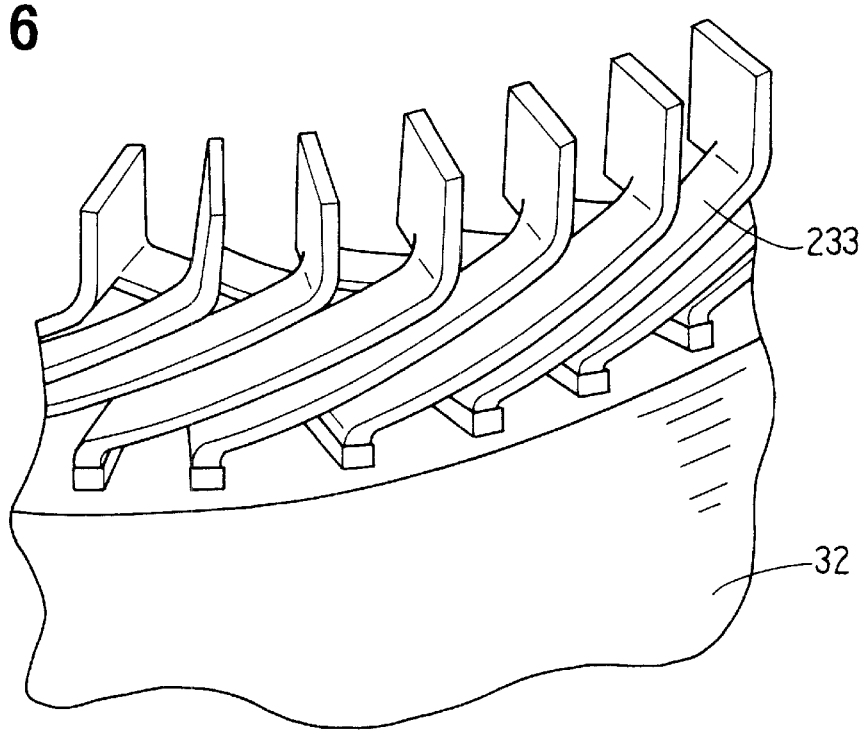
FIG. 6 shows a detailed configuration of an armature coil composed of the electric conductor shown in FIG. 5.
Figure 7:
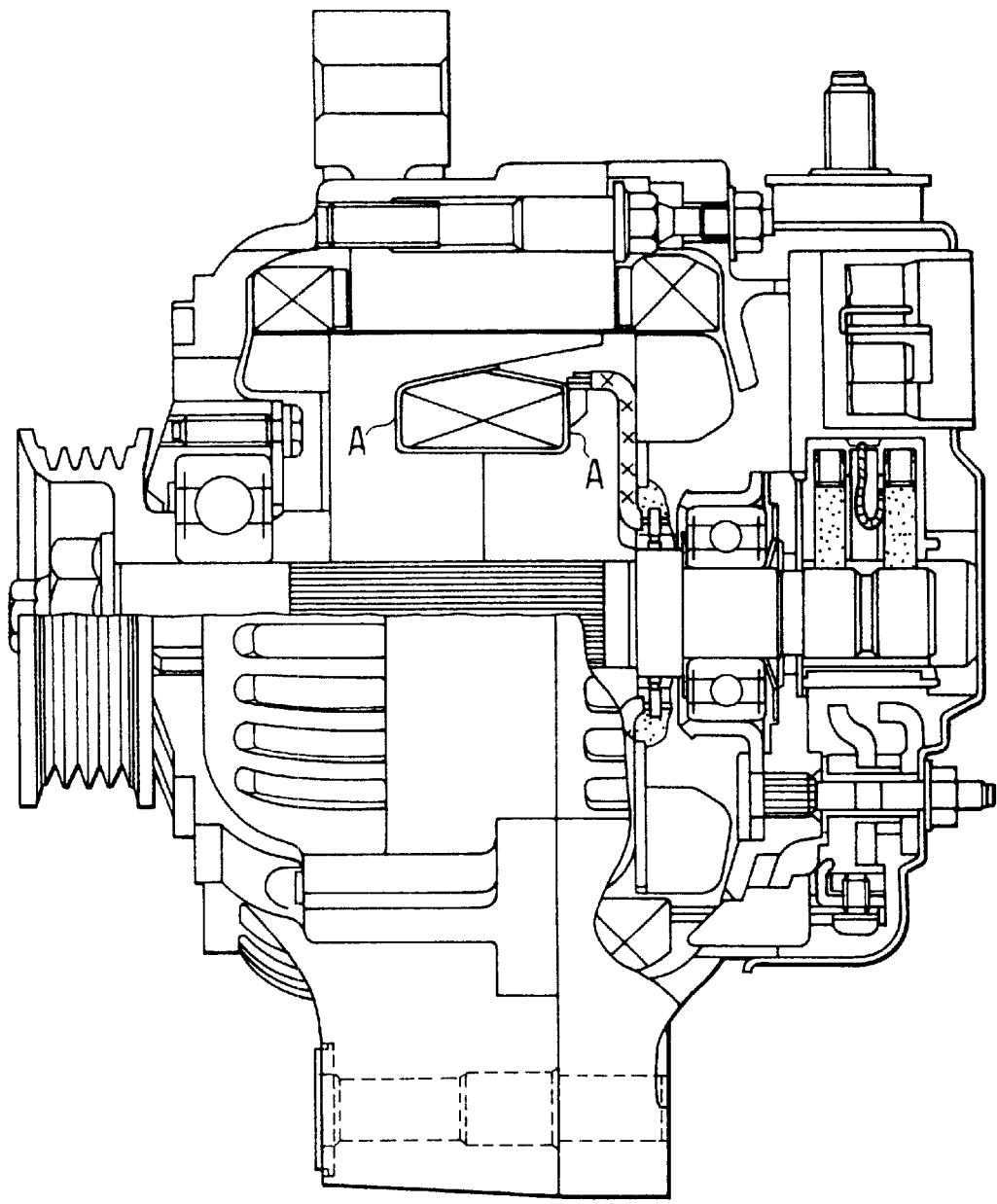
FIG. 7 is a sectional view showing main parts of an AC generator for a vehicle according to the prior art.
Figure 8:
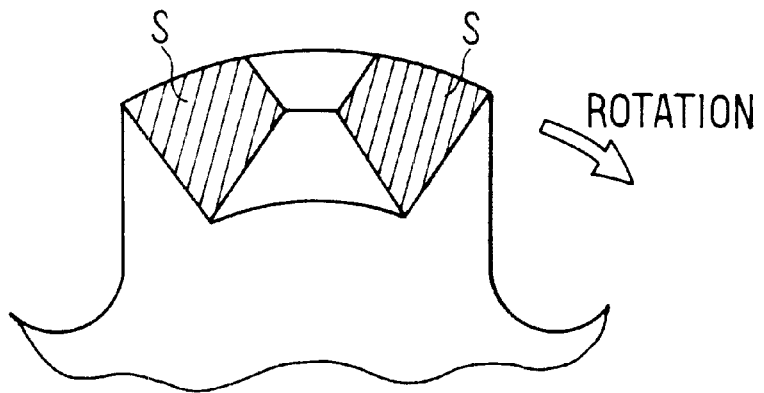
FIG. 8 is a partial plan view seen in the axial direction of a pole core of a rotor according to the prior art.
Figure 9:
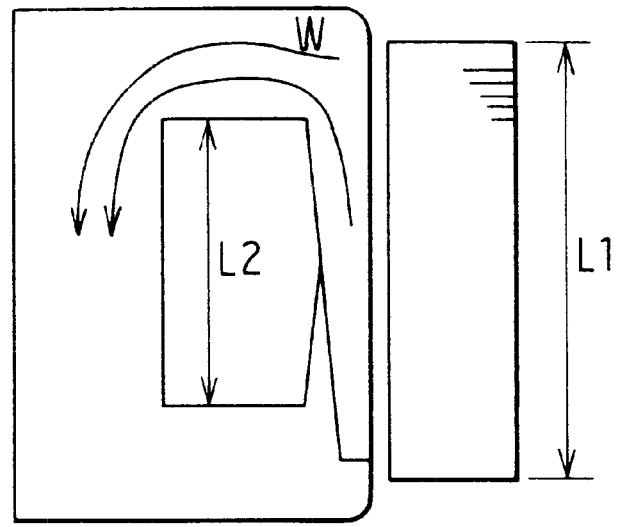
FIG. 9 shows heat flow in a conventional rotor.

FIG. 1 is a sectional view showing main parts of an AC generator for a vehicle according to an embodiment of the present invention. FIG. 2 is a sectional view showing a pole core of a rotor of the AC generator for a vehicle according to the present invention. FIG. 3 is a sectional view showing a cylindrical part of the pole core of the rotor. FIG. 4 is a partly sectional view showing the pole core of the rotor. FIG. 5 shows a detailed configuration of an electric conductor constituting a stator coil. FIG. 6 shows the configuration of an armature coil.

An AC generator for a vehicle includes a stator 2 operating as an armature, a rotor 3 operating as a magnetic field system, a housing 4 supporting the rotor 3 and the stator 2, a rectifier 5 directly connected to the stator 2 that converts AC into DC, and a voltage adjustment device 11 that adjusts the field current to control the amount of electric power generated. The voltage adjustment device 11, serving as a field current adjustment device, is connected to a higher potential side of a field coil to prevent an electric potential from being applied to the field coil when the generator 1 is not operating.

The rotor 3 rotates together with a shaft 6, and includes a Lundel-type pole core 7, cooling fans 12 (121, 122), a field coil 8, and slip rings 9, 10. The shaft 6 is connected to a pulley 20 and rotatably driven by a vehicle engine (not shown) mounted on a vehicle body. The pole core 7 of the rotor 3 includes three iron cores. These cores include a cylindrical part 71 corresponding to a boss and upper and lower iron cores 733 each consisting of a yoke part 72 and a claw-like magnetic pole part 73 integral with the yoke part 72. To realize a high power output by reducing a synchronous impedance, each claw-like magnetic pole part 73 consists of eight or more poles and thus the rotor 3 has 16 poles or more. The cylindrical part 71 and the upper and lower iron cores 733 are produced by press, forging or casting. The contact surface of the cylindrical part 71 and the upper and lower iron core 733 are not finished with a cutting tool, but an oxide film naturally formed is left thereon. As shown in FIGS. 2 and 3 showing the pole core sectionally, the cylindrical part 71 is tapered off axially from the outer-diameter side of the cylindrical part 71 to the inner-diameter side thereof to form a slight gap 71a between the contact surface of the cylindrical part 71 and that of the yoke part 72 such that the slight gap 71a is disposed at the inner-diameter side thereof. The difference between the axial length of the cylindrical part 71 at its inner-diameter side and the axial length thereof at its outer-diameter side is set to 3–20 $\mu$m to allow a reduction in the power output to be less than 0.5%. The metal cooling fan 12 is mounted on the upper and lower iron cores 733 such that heat is preferably transmitted therebetween. There is a difference between the configuration of blades or fan 121 number at the slip-ring side and that of the fan 122 not at the slip-ring side to allow the fans 121 and 122 to have a different exhaust capabilities. Thus, an axial flow is generated inside the rotor 3, proximate the claw-like magnetic pole part, due to the wind-pressure difference caused by the difference in the exhaust capability of the fan 121 and fan 122.

The field coil 8 is wound around a bobbin 81 made of resin such as nylon. The outer dimension of the field coil 8 is largest at the center in its axial direction and becomes gradually smaller toward the end in its axial direction. That is, the field coil 8 is mountain-shaped along the claw-like magnetic pole part 73 of the pole core. At an appropriate compressive force, the inner-diameter surface of the bobbin 81 contacts the peripheral surface of the cylindrical part 71 of the pole core at one or more portions thereof. A slight gap is formed partly between the end surface of the bobbin 81 in its axial direction and the inner surface of the yoke part 72 of the pole core in its axial direction. A resinous adhesive material is filled into the slight gap by utilizing capillary action to fix the bobbin 81 and the yoke part 72 to each other with the resinous adhesive material.

The stator 2 is composed of an iron core 32, an armature coil 33, and an insulator 34 insulating the iron core 32 and the armature coil 33 from each other. The housing 4 supports the stator 2. The iron core 32 is formed of thin steel plates laminated one upon another. The pole core 7 corresponds to the Lundel-type iron core.

Each part of the generator 1 will be described in detail below with reference to FIG. 4. The axial length L2 of the cylindrical part 71 of the pole core 7 is set smaller than the axial length L1 of the iron core 32 of the stator 2 such that the ratio of the axial length L1 of the iron core 32 to the axial length L2 of the cylindrical part 71 is set to the range of 1.25 to 1.75. The axial thickness of the yoke part 72 is X2. The sectional area of the yoke part 72 is set approximately equal (in the range of ±10%) to a value found by dividing the sectional area of the cylindrical part 71 by the number of a pair of magnetic poles (six in this embodiment). The radial thickness X1 of the root portion of the claw-like magnetic pole part 73 is smaller than the axial thickness X2 of the yoke part 72 such that the ratio of the radial thickness X1 of the root portion of the claw-like magnetic pole part 73 to the axial thickness X2 of the yoke part 72 is set to the range of 0.5–0.9.

The outer diameter R4 of the stator 2 is set to 129% of the outer diameter R1 of the claw-like magnetic pole part 73 of the pole core 7. As shown in FIG. 4, an air gap t is set to 0.35 mm which is generally used in the AC generator for a vehicle. The dimension ratio of each portion of the claw-like magnetic pole part 73, for example, its front end and that of each portion of other parts are set equally to those of a conventional generator for a vehicle. The outer diameter R1 of the claw-like magnetic pole part 73 is set to 92 mm. The armature coil 33 consists of approximately U-shaped electric conductors 231 each having two straight portions 232 as shown in FIG. 5. As shown in FIG. 6, one of the two straight portions 232 is disposed at the inner-diameter side of a slot (opening toward the radial direction) thus forming an inner layer of the electric conductor 231. Whereas the other of the two straight portions 232 is disposed at the outer-diameter side of the slot (the inward side in the radial direction) thus forming an outer layer of the electric conductor 231. The electric conductor 231 has at its end a turn portion 233 connecting ends of the two straight portions 232 to each other. That is, the turn portion 233 forms the coil end of the armature coil 33. A plurality of electric conductors 231 are inserted into slots of the stator iron core 32, respectively from one end surface thereof such that the coil ends are arranged at regular intervals in the circumferential direction of the stator iron core 32. The inner layer-forming and outer layer-forming straight portions 232 projecting from the other end surfaces of the respective slots are curved in the circumferential direction of the stator iron core 32. The armature coil 33 is formed by connecting the electric conductors 231 to each other such that the inner layer-forming straight portion 232 of one electric conductor 231 is connected to the outer layer-forming straight portion 232 of the adjacent electric conductor 231.

As described above, the axial length L1 of the iron core 32 of the stator 2 is set larger than the axial length L2 of the cylindrical part 71 of the pole core 7. is Further, the axial thickness X2 of the yoke part 72 of the pole core 7 is set larger than the radial thickness X1 of the claw-like magnetic pole part 73 of the pole core 7.

As described above, the temperature of the claw-like magnetic pole part 73 largely rises. But, in the present invention, the cylindrical part 71 of the pole core 7 is separate from the upper and lower iron cores each consisting of the yoke part 72 and the claw-like magnetic pole part 73, the contact surface of the cylindrical part 71 and that of the yoke part 72 serve as a thermal resistance, respectively. Thus, it is possible to restrain the heat generated at the claw-like magnetic pole part 73 from being transmitted to the cylindrical part 71 and consequently reduce the temperature of the cylindrical part 71. Further, in the embodiment, because the axial end surface of the cylindrical part 71 is tapered off to allow the gap 71a to be formed on the contact surface of the cylindrical part 71 and that of the yoke part 72, it is possible to prevent the transmission of the heat from the claw-like magnetic pole part 73 to the cylindrical part 71 owing to the increase of the thermal resistance caused by the presence of the gap 71a. The axial length of the gap 71a is set to 3–20 $\mu$m to allow a reduction in the output electric current to be less than 0.5%. Thus, the construction hardly deteriorates the effect of the AC generator compact and having a high power output.

The contact surface of the axial end surface of the cylindrical part 71, each yoke part 72 and claw-like magnetic pole part 73 are not finished with a cutting tool. Instead, an oxide film is formed thereon. These contact surfaces increase the thermal resistance, further reducing the temperature of the cylindrical part 71.

Further, the metal cooling fan is mounted on the upper and lower iron cores to transfer heat therebetween. In addition, the axial flow can be generated inside the rotor, proximate the claw-like magnetic pole part 73 owing to the wind-pressure difference caused by the difference between the exhaust capabilities of both fans. Thus, the cooling fans effectively radiate heat of the claw-like magnetic pole part 73.

Because these constructions are reduce temperature rise of the cylindrical part 71, thermal stress from thermal expansion between the resin and the metal is reduced in the axial direction of the cylindrical part 71. Accordingly, thermal fatigue of the resinous adhesive material filled between the bobbin 81 and the yoke part 72 is prevented.

In particular, in the embodiment, the ratio of the axial length L1 of the iron core 32 of the stator 2 to the axial length L2 of the cylindrical part 71 of the pole core 7 is set in the range of 1.25 to 1.75. In addition, the ratio of the radial thickness X1 of the root portion of the claw-like magnetic pole part 73 to the axial thickness X2 of the yoke part 72 is set to less than 1, preferably in the range of 0.5–0.9. The conventional AC generator has 12 poles, whereas the AC generator of the present invention has 16 poles.

In the conventional art, the temperature of the claw-like magnetic pole part 73 largely rises for the following reasons. First, there is the increase in the heat generation by eddy currents owing to the increase of magnetic flux generated by the yoke part 72 and the increase of an electric frequency. There is a heat generation increase in the stator 3 owing to the increase of magnetic flux, and deterioration of the self-radiation of the claw-like magnetic pole part 73 caused by a reduction in the side-surface area thereof. Therefore, in the conventional generator, it is necessary to enlarge the cooling fan and suppress the generated electric current. On the other hand, according to the present invention, it the temperature rise of the cylindrical part can be suppressed without oversizing each component while maintaining high power output. Therefore, the present invention is capable of providing a compact AC generator and has a high power output and thus high reliability. Further, because the cooling fan is not large, the noise generated is reduced during cooling. Further, because the claw-like magnetic pole part 73 is thinner than the yoke part 72, the claw-like magnetic pole part 73 is lightweight. Thus, centrifugal force-caused deformation of the claw-like magnetic pole is prevented when the rotor 3 rotates at a high speed.

The armature coil 33 consists of approximately U-shaped electric conductors 231 each having two straight portions 232. One of the two straight portions 232 is disposed at the inner-diameter side of a slot, namely, the open side in its radial direction, thus forming the inner layer of the electric conductor 231. The other straight portion 232 is disposed at the outer-diameter side of the slot, namely, the inward side in its radial direction. Thus, the outer layer of the electric conductor 231 is formed. A plurality of electric conductors 231 are inserted into slots of the stator iron core 32, respectively from one end surface thereof such that the coil ends. The conductors are arranged at regular intervals in the circumferential direction of the stator iron core 32. The inner layer-forming and outer layer-forming straight portions 232 projecting from the other end surfaces of the respective slots are curved in the circumferential direction of the stator iron core 32. The armature coil 33 is formed by connecting the electric conductors 231 to each other such that the inner layer-forming straight portion 232 of one electric conductor 231 is connected to the outer layer-forming straight portion 232 of the adjacent electric conductor 231.

Therefore, windings of the stator do not overlap each other at the coil ends thereof. This construction allows the windings of the stator to be disposed at a high density in the slot, the armature coil 33 to be formed with a low coil end height, and have a low resistance. Thereby, the heat generation of the armature coil 33 is suppressed. Further, because the coil ends are mesh-shaped, the armature coil 33 has favorable ventilation. Thus, temperature rise of the stator coil is suppressed. Accordingly, the amount of heat which the claw-like magnetic pole receives from the stator is reduced, which reduces the temperature of the claw-like magnetic pole. Thus, the amount of heat transferred to the cylindrical part of the pole core is reduced.

In the embodiment, both axial end surfaces of the cylindrical part are tapered. But either end surface may be tapered. In this case, heat transfer is suppressed. The tapered surface may be formed on one or both sides of the yoke part. The oxide film is formed on the contact surface of each cylindrical part and the yoke part. But the oxide film may be formed on the contact surface of the cylindrical part or the yoke part.

In the embodiment, the bobbin is made of resin. But other material such as paper may be used to form the bobbin so long as the material has insulating property and a thermal coefficient of expansion different from that of the metal. In this case, it is possible to prevent thermal fatigue of the resinous adhesive material filled between the bobbin and the yoke part.

While the above-described embodiments refer to examples of usage of the present invention, it is understood that the present invention may be applied to other usage, modifications and variations of the same, and is not limited to the disclosure provided herein.

What is claimed is:
1. An AC generator for a vehicle comprising:
   a field rotor having:
      a field coil; and
      a Lundel-type iron core having a cylindrical part on which said field coil is wound;
      a yoke part extending radially outward from said cylindrical part; and
      a claw-like magnetic pole part connected to said yoke part and surrounding said field coil;
      wherein said field coil is wound on an insulating bobbin and contacts said cylindrical part, wherein an axial end surface of said bobbin is fixed to said yoke part through an adhesive agent;
   a stator having:
      an iron core confronting said rotor; and
      a multiple-layer winding mounted on said iron core of said stator;
   wherein an axial length of said iron core of said stator is set larger than an axial length of said cylindrical part;
   wherein an axial thickness of said yoke part is set larger than a radial thickness of said claw-like magnetic pole part; and
   wherein said cylindrical part is separate from said yoke part and adjacent to said yoke part with said cylindrical part fitted within said yoke part.

2. An AC generator according to claim 1, wherein a gap is formed between a contact surface of said cylindrical part and a contact surface of said yoke part.

3. An AC generator according to claim 1, wherein an oxide film is formed on a contact surface of said cylindrical part and said contact surface of said yoke part.

4. An AC generator according to claim 1, wherein the ratio of said axial length of said iron core of said stator to said axial length of said cylindrical part is set in a range of 1.25 to 1.75, and the ratio of said radial thickness of said claw-like magnetic pole part to said axial thickness of said yoke part is set in a range of 0.5–0.9.

5. An AC generator according to claim 1, wherein said iron core of said stator has a plurality of spaced slots, said multiple-layer winding of said stator has a plurality of pairs of conductive segments insulated from each other and arranged circumferentially along said iron core of said stator without overlapping, one part of each pair of said conductive segments forming an inner layer with respect to a depth direction of each of said slots and another of each pair forming an outer layer with respect to said depth direction; said conductive segments extending to an end-surface side of said iron core of said stator outside said slots to form coil ends by connecting said inner-layer conductive segments and outer-layer conductive segments in said slots in series to each other such that a group of said coil ends consisting of a plurality of repetition of said connection patterns is formed on said end-surface side of said iron core of said stator.

6. An AC generator according to claim 1, wherein said rotor has 16 poles or more.

7. An AC generator according to claim 1, wherein said rotor has a metal cooling fan mounted on both axial end surfaces of said rotor such that heat is transferred between said Lundel-type iron core and said cooling fan, configurations said cooling fans being different from each other to vary exhaust capabilities thereof and generate an axial flow inside said rotor.

* * * * *